(12) United States Patent
Mücke et al.

(10) Patent No.: US 11,976,683 B2
(45) Date of Patent: May 7, 2024

(54) TOLERANCE COMPENSATION ARRANGEMENT

(71) Applicant: Böllhoff Verbindungstechnik GmbH, Bielefeld (DE)

(72) Inventors: Michaela Mücke, Detmold (DE); Michael Kahre, Herford (DE); Jörn Kleffmann, Hiddenhausen (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 274 days.

(21) Appl. No.: 17/690,037

(22) Filed: Mar. 9, 2022

(65) Prior Publication Data
US 2022/0290705 A1 Sep. 15, 2022

(30) Foreign Application Priority Data
Mar. 10, 2021 (DE) .......................... 102021105786.8

(51) Int. Cl.
*F16B 5/02* (2006.01)

(52) U.S. Cl.
CPC .............. *F16B 5/0233* (2013.01); *F16B 5/02* (2013.01)

(58) Field of Classification Search
CPC ........ F16B 5/02; F16B 5/0233; F16B 5/0283; F16B 21/086; F16B 35/00; F16B 39/10; F16B 39/24; F16B 43/00
USPC .......................... 411/383, 500–501, 508, 546
See application file for complete search history.

(56) References Cited

U.S. PATENT DOCUMENTS

| | | | |
|---|---|---|---|
| 6,357,953 B1 * | 3/2002 | Ballantyne | F16B 5/0233 403/372 |
| 8,061,948 B2 * | 11/2011 | DeGelis | F16B 5/0233 411/522 |
| 8,066,465 B2 | 11/2011 | Figge et al. | |
| 8,202,033 B2 * | 6/2012 | Choi | B62D 27/065 411/546 |

(Continued)

FOREIGN PATENT DOCUMENTS

| | | |
|---|---|---|
| CN | 104417627 A | 3/2015 |
| CN | 108361265 A | 8/2018 |

(Continued)

OTHER PUBLICATIONS

CN Office Action for CN Application No. 202210240843.3 dated Aug. 7, 2023 (6 pages).

*Primary Examiner* — Roberta S Delisle
(74) *Attorney, Agent, or Firm* — Reising Ethington P.C.

(57) ABSTRACT

A tolerance compensation arrangement enables fastening two components with compensation of tolerances between the components. The arrangement includes a base element with a passage opening, an inner thread, an adjusting element with a supporting collar and with a thread sleeve having an outer thread which matches the inner thread. On a first front side of the base element, the adjusting element is screwed into the passage opening and on a second front side of the base element, a holding structure faces away from the adjusting element. The holding structure has at least one locking web and a supporting structure, so that via a lateral or an axial insert opening in the front-sided holding structure, a fastening structure configured with two steps is fastenable friction-fit and form-fit in the holding structure an opening in the front-sided holding structure.

17 Claims, 11 Drawing Sheets

(56) References Cited

U.S. PATENT DOCUMENTS

| | | | |
|---|---|---|---|
| 8,864,432 B2 * | 10/2014 | Figge | F16B 5/025 |
| | | | 411/383 |
| 9,074,614 B2 * | 7/2015 | Schwarzbich | F16B 5/00 |
| 9,205,875 B2 | 12/2015 | Calisoglu et al. | |
| 9,464,659 B2 * | 10/2016 | Schwarzbich | F16B 35/04 |
| 11,454,265 B2 | 9/2022 | Figge | |
| 11,512,732 B2 | 11/2022 | Figge | |
| 2006/0280579 A1 | 12/2006 | Seidl et al. | |
| 2007/0092355 A1 * | 4/2007 | Burger | F16B 5/0233 |
| | | | 411/551 |
| 2020/0173472 A1 | 6/2020 | Erpenbeck | |
| 2020/0248733 A1 * | 8/2020 | Figge | F16B 5/0233 |
| 2020/0400173 A1 | 12/2020 | Figge | |
| 2021/0018026 A1 | 1/2021 | Purwin | |
| 2021/0071695 A1 | 3/2021 | Figge et al. | |

FOREIGN PATENT DOCUMENTS

| | | |
|---|---|---|
| CN | 111512052 A | 8/2020 |
| CN | 111742152 A | 10/2020 |
| CN | 112041569 A | 12/2020 |
| DE | 102008055526 A1 | 6/2010 |
| DE | 102007037242 B4 | 5/2019 |
| DE | 102019206099 A1 | 10/2020 |
| EP | 3660339 A1 | 6/2020 |

\* cited by examiner

TOLERANCE COMPENSATION ARRANGEMENT

CROSS REFERENCE TO RELATED APPLICATIONS

This application claims the priority of German patent application No. DE102021105786.8, filed on Mar. 10, 2021, and the content of this priority application is incorporated herein by reference in its entirety.

TECHNICAL FIELD

The present disclosure is related to a tolerance compensation arrangement for fastening a first component at a second component with automatic compensation of tolerances in the distance between the first and the second component. Likewise, the present disclosure relates to a first and a second component which are fastened to each other by means of a screw via a tolerance compensation arrangement, a production method as well as an installation method of a tolerance compensation arrangement.

BACKGROUND

Large varieties of tolerance compensation arrangements are known. Usually, they consist of an adjustment bush with a so-called dragging section which is capable of entering into a frictional connection with a fastening screw. When rotating the fastening screw, the adjustment bush is therefore co-rotated until it abuts one of the two components, whereupon when further rotating the fastening screw and correspondingly increasing the torque, the frictional connection is overcome so that then, the two components can be clamped together by the fastening screw via the adjustment bush.

DE 10 2007 037 242 B4 describes a tolerance compensation arrangement which is fastened to one side with the help of a blind rivet nut. This blind rivet nut comprises a fastening collar which is configured at least in a two-stepped manner in its axial direction. This fastening collar serves for fastening a cage for a base element. In this case, the base element is a hexagonal nut which is held within the cage. The adjusting element is then screwed into the inner thread of the hexagonal nut so that a tolerance compensation arrangement is formed.

This tolerance compensation arrangement consists of a plurality of individual parts, the assembly of which is laborious. It is particularly necessary that the blind rivet nut is arranged in a fastening opening together with the cage element before the blind rivet nut can be fastened in the fastening opening by means of a crimp process. Otherwise, it would not be possible to fasten the cage element to the fastening collar of the blind rivet nut.

EP 3 660 339 A1 describes a tolerance compensation arrangement which must be fastened in an edge section of a component. Because in edge proximity, the component also comprises a fastening opening with a welding nut as a fastening element arranged to it on one side. Alternatively to a welding nut, an insert nut which is also fastened to the component can be used into which the fastening screw of the tolerance compensation arrangement is screwed in later. The idea of the tolerance compensation arrangement of EP 3 660 339 is that the tolerance compensation arrangement is configured similarly as an edge clamp. This edge clamp comprises two legs arranged opposite one another. One of the legs is a tong-like fastening leg encompassing the insert nut or the welding nut on one side and holding the tolerance compensation arrangement in position there. In the other leg, the adjusting element is arranged within an adjusting thread. Furthermore, the leg with the adjusting element is positioned exactly opposite to the holding leg. Accordingly, a fastening screw which is screwed into the adjusting element is automatically screwed into the insert nut or welding nut at which the holding leg holds on. The disadvantage of this tolerance compensation arrangement is that it cannot be used for fastening threads of a component which are arranged outside of an edge portion. Because the reach of the clamping arrangement of the tolerance compensation element is limited and not adaptable randomly to positions of a fastening thread.

A further tolerance compensation arrangement is disclosed by DE 10 2008 055 526 A1. In this construction, the base element consists of some kind of cage in which a thread sleeve with inner thread is fastened. The cage is fastened to a blind rivet nut with the help of a bayonet lock. Accordingly, the blind rivet nut can already be preassembled in the first component, in particular in the fastening opening. The blind rivet nut has a fastening collar which is adapted to the cage to be fastened. This fastening collar is configured star-like with a number of radially outwardly projecting fastening latches. The cage element with thread element has a holding structure on the front side facing the blind rivet nut. The adjusting element of the tolerance compensation arrangement is screwed in at the opposite front side. The holding structure of the cage element is adapted constructively in order to form a bayonet connection with the fastening collar of the blind rivet nut. For this purpose, the holding structure is equipped with an axial insert opening for the fastening collar of the blind rivet nut. In terms of its shape, this insert opening is configured complementary to the axial outer contour of the fastening collar of the blind rivet nut. When the fastening collar is inserted into the holding structure of the cage element in axial direction and subsequently, the cage element is rotated about its central axis, a bayonet connection which is not releasable non-destructively arises between the fastening collar of the blind rivet nut and the cage element of the tolerance compensation arrangement. The installation of the tolerance compensation element at the fastening collar of the blind rivet nut is laborious and prone to installation mistakes. Because first of all, it is necessary that the axial insert opening is aligned precisely to the star-like design of the fastening collar according to its contour. In case not all radially outwardly projecting latches of the fastening collar catch a matching indentation in the insert opening, the subsequent rotating of the cage element is blocked. Furthermore, it is necessary that for establishing the bayonet connection, the radially outwardly projecting latches of the fastening collar overcome springing blocking levers. These levers counteract the rotation movement due to their spring force. It would therefore be advantageous when the worker could rotate the cage element with the help of a tool into the bayonet connection. The assembly space necessary for that is most of the time not available so that the installation of the cage element at the disclosed fastening collar is made difficult for the worker.

It is therefore the object of at least some implementations of the present disclosure to provide a tolerance compensation arrangement which can be arranged between two components with a reduced installation effort due to an alternative construction regarding the known tolerance compensation arrangements.

SUMMARY

The above object is solved by a tolerance compensation arrangement for fastening a first component at a second component with automatic compensation of tolerances in the space between the first component and the second component, by a further tolerance compensation arrangement for fastening a first component at a second component, by a first and a second component being fastened to each other via the above-mentioned tolerance compensation arrangement by means of a fastening screw, by a production method of the tolerance compensation arrangement as well as an installation method for the above-mentioned tolerance compensation arrangements. Advantageous configurations and further embodiments of the present disclosure result from the dependent claims, the following description and the accompanying drawings.

The tolerance compensation arrangement for fastening a first component to a second component with automatic compensation of tolerances in the distance between the first component and the second component includes the following features: a sleeve-like base element with a passage opening, the radial inner side of which comprises an inner thread of a first thread direction, an adjusting element with a supporting collar facing away from the base element at the front side and with a thread sleeve comprising, at a radial outside, an outer thread which matches the inner thread of the base element and in a passage channel, a dragging element, which may have at least one radially inwardly projecting spring arm, which narrows the passage channel, on a first front side of the base element, the adjusting element is screwed into the passage opening and on a second front side of the base element, a holding structure is provided on the front side which faces away from the adjusting element, the holding structure having at least one locking web being arranged in a springy manner with a supporting structure being arranged axially adjacent to the locking web and adapted to a form-fit to be generated, so that a fastening structure configured with two steps in at least an axially longitudinal direction, may be a two-stepped supporting collar of a blind rivet nut, which may be fastenable friction-fit and form-fit in the holding structure via a lateral or an axial insert opening in the front-sided holding structure.

In terms of its principal configuration consisting of base element and adjusting element, the tolerance compensation arrangement is based on the construction of known tolerance compensation arrangements. Accordingly, the base element comprises a passage opening with inner thread into which the adjusting element is screwed in via its thread sleeve that is adapted to the inner thread. As soon as a fastening screw is screwed through the passage channel of the adjusting element and the passage opening of the base element into a fastening thread, in this case the fastening thread of a blind rivet nut with a supporting collar that may be at least two-stepped in axial direction, the adjusting element is rotated out from the base element by the dragging element or a differently configured dragging element of the adjusting element, based on the rotation of the fastening screw. A dragging element is constructed in different ways according to the alternatives known from the state of the art. It may consist of a springing oval narrowing the passage channel, into which the fastening screw is plugged in. The oval is formed by a circumferential spring web and lies in a radial plane with respect to the longitudinal axis of the adjusting element. Another alternative of the dragging element uses one or more linearly or curvilinearly extending webs or spring arms out of metal or plastic material which project into the passage channel in a narrowing manner. The rotation movement which is transferred onto the adjusting element takes place until the space between the two components to be fastened to each other is compensated automatically with the help of the length increase of the tolerance compensation arrangement. After that, the fastening screw may be screwed tight in the inner thread of the blind rivet nut.

In contrast to known tolerance compensation arrangements, the base element comprises a holding structure at its front side which faces away from the adjusting element. This holding structure is adapted so as to be fastened to at least one two-stepped fastening structure before the fastening screw is screwed into the tolerance compensation arrangement. The fastening structure is arranged adjacent to a fastening opening of the second component. With regard to the installation direction of the fastening screw, the fastening structure comprises, in axial longitudinal direction of the used blind rivet nut, a supporting collar being configured at least two-stepped, which rests against the component after the blind rivet nut has been set. While in the present disclosure, a blind rivet nut may be used, instead of the blind rivet nut, an insert nut or a welding nut with corresponding fastening structure adjacent to the fastening opening may be used in the second component.

The at least two-stepped fastening structure may denote two constructive steps when observed in axial direction with respect to the installation direction, which may be arranged perpendicularly to the installation direction and have a different lateral or radial extension. In this context, the step of the fastening structure which faces away from the second component is configured bigger in lateral or radial direction than a step arranged adjacently to it, of the fastening structure which faces the second component. Thus, the step which faces away from the second component forms an undercut in the installation direction at which the base element is fastenable via its front-sided holding structure.

In order to fasten the tolerance compensation arrangement via the front-sided holding structure of the base element to the at least two-stepped fastening structure, the holding structure may be configured with two steps with respect to the longitudinal axis of the base element. The axial two-step nature of the holding structure means that with respect to the longitudinal axis of the base element, at least two steps of different functionality and different configuration follow one another or are arranged axially one after another, respectively. These steps may each lie in a radial plane with respect to the longitudinal axis of the base element.

The holding structure may include a friction-fit locking step in a direction axially facing away with respect to the adjusting element. The locking step could also be referred to as undercut step, as becoming clear from the following description.

In axial direction of rotating out the adjusting element, the locking step is followed by a form-fit step. This step may provide for a torque-proof arrangement of the base element at the fastening structure. In this context, torque-proof means that a form-fit between the fastening structure and the base element prevents a rotation of the base element about its longitudinal axis.

According to a first alternative of the tolerance compensation arrangement, the fastening structure is fastened in the front-sided holding structure via a lateral insert opening. For this purpose, the front-sided holding structure has a locking web which may be configured loop-like and into which the fastening structure locks due to the lateral insertion movement through the insert opening. The locking spring loop may reach under the laterally or radially bigger step of the fastening structure which faces away from the component, so that the spring loop is arranged between the second component and the bigger step, which faces away from the component, of the fastening structure, by using the undercut of the fastening structure. While in this way, a fixation of the tolerance compensation arrangement acting in the installation direction may be achieved, a circumferential encompassing of the fastening structure by the springily configured locking web may provide for an additional fastening of the tolerance compensation arrangement acting perpendicularly with respect to the installation direction.

According to a further configuration of the tolerance compensation arrangement, the holding structure of the base element may include an axial insert opening for the fastening structure which may be configured with at least two steps. The axial insert opening into the front-sided holding structure comprises laterally or radially inwardly projecting locking latches. At least two locking latches may be arranged on an inside of the insert opening so that after the inserting of the at least two-step fastening structure into the axial insert opening, these locking latches lockingly reach under the step which may be bigger and faces away from the second component, in order to use the axial undercut of the at least two-stepped fastening structure for fastening the tolerance compensation arrangement. While the interaction of the different alternatives of the locking structure with the fastening structure, the blind rivet nut, may cause a friction-fit connection between the base element and the second component, an adaption of shape between the outer contour of the fastening structure and the inner contour of the holding structure may provide for an additional form-fit between the base element and the fastening structure.

According to a further configuration of the tolerance compensation arrangement, the holding structure with lateral insert opening in the direction of a central axis of the base element comprises a locking step, arranged perpendicular to the central axis, with a locking plane, and axially adjacent to that, a plane supporting step arranged perpendicular to the central axis.

In adaption to the at least two-stepped fastening structure, in this case the at least two-stepped supporting collar of the blind rivet nut, the holding structure with lateral insert opening may also be configured two-stepped. In this two-stepped holding structure, the locking step, facing the second component, firstly provides for an undercutting locking at the two-stepped fastening structure. Adjacent to the locking step, which may be directly adjacent to it, a supporting portion or supporting structure, respectively, is provided in the holding structure, into which the fastening structure is fit in a form-fit manner after the locking in the locking structure. In this context, form-fit fitting means that in adaption to the outer shaping of the fastening structure, the supporting structure comprises a complementary configured receiving opening or receiving recess, respectively. As soon as the locking structure locks the fastening structure, hence holding it in axial direction, i.e., parallel to the installation direction, it is also held in the supporting structure in a form-fit manner. This form-fit may have the effect that a rotating about the longitudinal axis of the base element is prevented. This form-fit may guarantee that during the inserting of the fastening screw and the associated adjusting of the adjusting element, the base element is not co-rotated. In this way, a screwing-in of the fastening screw and an associated adapting of the tolerance compensation arrangement in terms of its length to the space between the two components to be connected effectively takes place.

In order to support the effect of the supporting structure, the circumferential shape of the fastening structure is nonrotationally symmetrical. This is for example guaranteed by means of a polygonal shape or by an oval shape of the fastening structure in a plane perpendicular to the installation direction. The supporting structure is configured in the holding structure of the base element in a complementary or at least in a form-fit manner adapted to the shape of the fastening structure, in order to receive the fastening structure.

According to a further shape of the tolerance compensation arrangement, the locking step may include a plane spring loop with a lateral insert opening or two non-linearly extending spring arms lying opposite to one another and spaced to one another, the spring loop or the spring arms being encompassed by an axially aligned supporting collar.

The spring loop of the locking structure may encompass a surface perpendicular to the installation direction. Furthermore, the spring loop may have a lateral opening so that the fastening structure which is configured with at least two steps is slidable into the spring loop laterally. Thus, the spring loop may define an opening, the size of which is described by the encompassed surface, which is adapted to the outer circumference and/or diameter of the component-facing step of the fastening structure. Due to this adaption, the passage opening of the spring loop may be smaller adjacent to the insert opening in terms of its diameter than the diameter of the step of the fastening structure which faces away from the component. In this manner, the spring loop may undercut the step of the fastening structure which faces away from the component in order to fasten the base element to it.

Two spring arms may be used instead of the spring loop, which laterally engage the fastening structure after the inserting of the fastening structure. The non-linearly shape of the spring arms may guarantee that due to the interacting of the two spring arms, a form-fit in lateral direction with the fastening structure and with respect to the installation direction can be reached beside the friction-fit to the fastening structure.

According to a further design of the tolerance compensation arrangement, the supporting step may have a non-round recess in the direction of the central axis of the base element, in which the fastening structure is receivable in a form-fit manner via the lateral insert opening. In the direction of the central axis of the base element the locking step of the holding structure may be arranged such that it faces away from the adjusting element, and the supporting step is arranged such that it faces towards the adjusting element.

According to a further configuration of the tolerance compensation arrangement, the holding structure with axial insert opening comprises on the front side in the direction of a central axis of the base element, the axial insert opening with an axial locking step having holding locking latches in axial direction and adjacent to that, a supporting step arranged perpendicularly to the central axis and adapted to a form-fit.

The above-described tolerance compensation arrangement with lateral insert opening may offer the worker the advantage in case of a limited available constructional space to laterally slide and lock the tolerance compensation arrangement on the fastening structure, which has already been set into a fastening opening of the second component, of a blind rivet nut which is present there. For this, only an offsetting movement or pushing movement is necessary with regard to the later installation direction of the fastening screw until the holding structure locks at the fastening structure of the blind rivet nut. Subsequently, it may be necessary that with a rotation of the base element about its longitudinal axis, the alignment of the non-rotation symmetrical fastening structure to the correspondingly adapted shape of the supporting structure may be adapted by means of rotating the base element. Only by that the form-fit between the supporting structure and the fastening structure may be established. For these processes, it may not be necessary that the worker uses a tool for the installation of the tolerance compensation arrangement at the fastening structure of the pre-installed blind rivet nut at the second component.

With regard to the above-described tolerance compensation arrangement with axial insert opening, the worker may fasten the base element or the tolerance compensation arrangement, respectively, advantageously parallel to the installation direction of the fastening screw, by means of an offset of the base element in the direction of the installation direction of the fastening screw. In this way, the locking structure snaps into the two-stepped fastening structure of the second component adjacent to the axial insert opening, so that the locking latches may undercut the larger step of the fastening structure which faces away from the component. While the axial locking step holds the fastening structure in the holding structure of the base element due to its undercutting, the form-fit between the supporting structure arranged adjacent to the locking structure and the non-rotational symmetrical design of the fastening structure provides for a torque-proof arrangement of the base element with respect to its longitudinal axis.

According to a further configuration of the tolerance compensation arrangement with axial insert opening, the holding structure includes at least two radially or laterally inwardly protruding locking latches which may be arranged in a ring around the axial insert opening and limit a receiving space of the supporting step in axial direction facing away from the adjusting element.

The above-described locking latches may reduce the radial or lateral expansion of the axial insert opening. As these locking latches may be arranged in a ring-like structure in a laterally outwardly springy manner, the fastening structure can overcome the inwardly protruding locking latches when the fastening structure is inserted into the holding structure of the base element. After that, the inwardly projecting locking latches undercut the fastening structure which is configured with at least two steps. By that, the fastening structure may be received in the holding structure of the base element and the fastening collar, which is configured non-round, of the blind rivet nut or more generally, the non-round configured fastening structure at the second component is arranged in the receiving space of the holding structure. The receiving space serves for the form-fit connection between fastening structure and base element within the holding structure, which has already been described above. Because the supporting step adjacent to the inwardly projecting locking latches may have a receiving shape adapted with respect to the outer design of the fastening structure. As soon as the non-round fastening structure is properly aligned in the receiving space with the likewise non-round design of the supporting step, a form-fit between the fastening structure and the holding structure may be formed for a torque-proof fastening of the base element at the fastening structure and thus at the second component.

According to a further configuration of the tolerance compensation arrangement, the supporting step includes a non-round recess in the direction of the central axis in which the fastening structure may be receivable in a form-fit manner via the lateral insert opening.

With respect to the above-described designs of the tolerance compensation arrangement, a fastening screw with a thread of a second thread direction opposite the first one may be provided, which is adapted to the tolerance compensation arrangement. This fastening screw may be arranged within the tolerance compensation arrangement.

The present disclosure furthermore includes a tolerance compensation arrangement for the fastening of a first component at a second component with automatic compensation of tolerances in the distance between the first component and the second component with the following features: a sleeve-like base element with a passage opening, the radial inner side of which includes an inner thread of a first thread direction, an adjusting element with a supporting collar, facing away from the base element on the front side and having a thread sleeve which comprises on a radial outer side an outer thread matching the inner thread of the base element and in a passage channel a dragging element narrowing the passage channel which may be with at least one radially inwardly projecting spring arm with the dragging element, on a first front side of the base element, the adjusting element is screwed into the passage opening and on a second front side of the base element facing away from the adjusting element, a front-sided holding structure is provided which includes at least one fork-like holding web arranged in a springy manner in combination with a supporting structure which is arranged adjacent to the holding web and adapted to a form-fit to be established, so that via a lateral insert opening in the holding web and an axial insert opening in the front-sided holding structure, a fastening structure which is configured with two steps at least in longitudinal-axial direction, may be a two-stepped supporting collar of a blind rivet nut, may be fastenable torque-proof in the holding structure in a friction-fit and form-fit manner.

In accordance with the above-described embodiments of the tolerance compensation arrangement, a supporting structure is also provided here in the holding structure of the base element. The supporting structure may be adapted to the shape of the fastening structure of the blind rivet nut in order to generate a form-fit between the holding structure and the fastening structure. In contrast to the above-described tolerance compensation arrangements, a springing clamping step may limit the holding structure of the base element on the front side. This springing clamping step is formed by two fork-like holding webs which are arranged in a springing manner. These holding webs may be laterally spaced from one another far enough so that they can receive the fastening structure between them in an undercutting manner. This may take place by means of a radial or lateral insertion movement of the fastening structure between the fork-like holding webs which are extending substantially perpendicularly to the longitudinal axis of the base element.

As the fork-like holding web with its two spring arms is fastened to one side at the base element, the fork-like holding web may be movable in a springy manner in longitudinal direction of the base element. This may guarantee that the distance of the fork-like holding web can be increased springily to the front side of the base element in order to be able to position the fastening structure of the second component between holding web and supporting step of the base element. As the fork-like holding web may have the intention to return back into its initial position, it may press the fastening structure into the supporting step when being in this position and thus through the axial insert opening of the holding structure of the base element. In case of a suitable alignment in the supporting step, a form-fit connection between the fastening structure and the base element may be established due to the adaption in shape between the outer shape of the fastening structure and the inner shape of the supporting step. In this manner, this configuration of the tolerance compensation arrangement may also realize a torque-proof connection between the fastening structure at the second component and the base element.

According to a further configuration of the tolerance compensation arrangement, the fork-like holding web may be arranged on the second front side of the base element and includes two spring webs adjacent to one another and extending perpendicularly to the longitudinal axis of the base element, with the spring webs extending laterally from the passage opening.

According to a further configuration of the above-described tolerance compensation arrangement, the supporting structure comprises at least two positioning webs on the second front side of the base element, which may be three or four, adjacent to the passage opening, which are adapted so as to form a torque-proof form-fit with the fastening structure.

In alternative configuration to an above-described receiving space within the supporting step, may be when the supporting step may be formed by an abutment surface on the front side at the base element. In order to realize the form-fit between the fastening structure and the base element on the front-sided abutment surface of the base element, the abutment surface may include at least two positioning webs. These positioning webs enclose a non-round inner space in which the likewise non-round fastening structure of the second component is arrangeable. As the spring webs of the fork-like holding web, which may extend perpendicularly to the longitudinal axis of the base element, press the fastening structure against the abutment surface of the supporting step, the torque-proof arrangement of the base element may also be guaranteed in this way.

The present disclosure furthermore includes a first and a second component which are fastened to one another via the tolerance compensation arrangement according to one of the above-described configurations by means of a fastening screw, wherein the first component includes a passage opening for the fastening screw and wherein in a fastening opening of the second component, a blind rivet nut with a front-sided supporting collar that is at least two-stepped in axial direction is arranged, at which supporting collar the base element is fastened and into which the fastening screw is screwed.

Furthermore, the present disclosure includes a production method of the above-described tolerance compensation arrangement, comprising the following steps: providing the sleeve-like base element with a passage opening, the radial inner side of which includes an inner thread of a first thread direction, which may be with an injection molding method, providing the adjusting element with a supporting collar and with a thread sleeve, which may be with an injection molding method, wherein the thread sleeve includes an outer thread on a radial outside matching the inner thread of the base element and in a passage channel, comprises a dragging element which may be with at least one radially inwardly projecting spring arm, the dragging element narrowing the passage channel, after that, screwing the adjusting element into the base element.

Moreover, the present disclosure includes an installation method of one of the above-described tolerance compensation arrangements comprising the following steps: fastening the base element at a supporting collar having at least two steps in axial direction of a blind rivet nut that is arranged in a fastening opening of the second component, in which the supporting collar is fastened at the front-sided holding structure of the base element, screwing a fastening screw through a passage opening of the first component into the adjusting element within the base element of the tolerance compensation arrangement, thereby bridging a distance between the first and the second component with the tolerance compensation element by adjusting the length of the same, and subsequently screwing the fastening screw into the blind rivet nut at the second component.

BRIEF DESCRIPTION OF THE DRAWINGS

Embodiments of the present disclosure are described in detail with reference to the accompanying drawings, showing.

DETAILED DESCRIPTION

In a connection, a lamp housing, herein referred to with A, may be connected with a vehicle body, herein referred to with B. In order to compensate a fastening distance between the two parts A, B with respect to one another, the parts A, B may be fastened to each other with the help of a tolerance compensation arrangement 1 and a fastening screw S.

Figure 1:
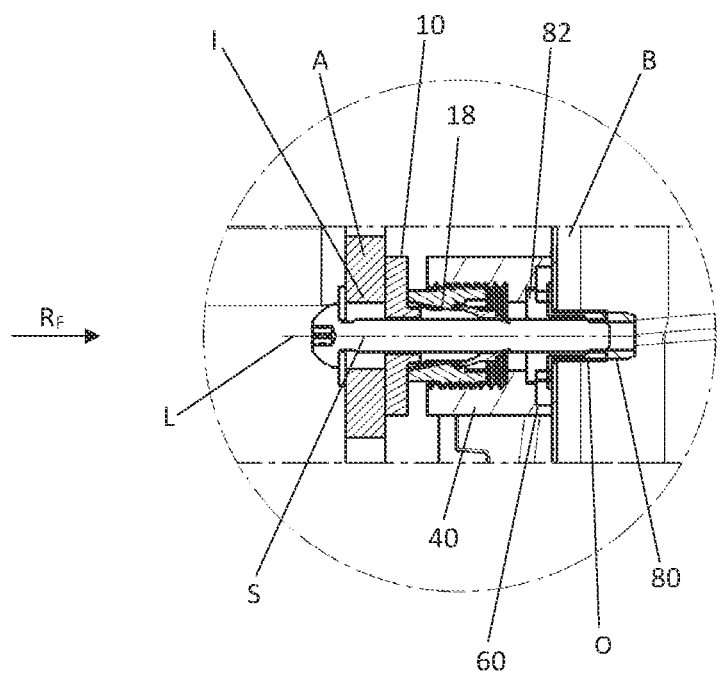
FIG. 1 a schematic sectional view of an embodiment of a tolerance compensation arrangement in combination with a fastening screw, the embodiment connecting the components A and B, FIG. 2 a perspective exploded view of an embodiment of a tolerance compensation arrangement with a fastening screw and a blind rivet nut, FIG. 3 the arrangement according to FIG. 2 in another perspective view, FIG. 4 a perspective exploded view of an adjusting element, a base element and a blind rivet nut of an embodiment of the tolerance compensation arrangement, FIG. 5 another view of the arrangement according to FIG. 4, FIG. 6 the base element with screwed-in adjusting element in combination with the non-set blind rivet nut according to FIG. 4, FIG. 7 the base element with screwed-in adjusting element in connection with the blind rivet nut according to FIG. 6, FIG. 8 another view of the arrangement according to FIG. 6, FIG. 9 a perspective exploded view of another embodiment of the tolerance compensation arrangement with a fastening screw and a blind rivet nut, FIG. 10 another view of the arrangement according to FIG. 9, FIG. 11 an enlarged representation of an embodiment of the base element with respect to the holding structure, FIG. 12 a tolerance compensation arrangement fastened to the first component having a base element according to FIG. 11 and a fastening screw that is screwed into the blind rivet nut, FIG. 13 a perspective exploded view of another embodiment of the tolerance compensation arrangement with a fastening screw and a blind rivet nut, FIG. 14 another view of the arrangement according to FIG. 13, FIG. 15 another view of the arrangement according to FIG. 13, FIG. 16 an embodiment of the base element of the tolerance compensation arrangement according to FIG. 13, FIG. 17 perspective views of two embodiments of a blind rivet nut, which are used in combination with the tolerance compensation arrangement, FIG. 18 a flow chart of an embodiment of a production method for the tolerance compensation arrangement, and FIG. 19 a flow chart of an embodiment of an installation method of the tolerance compensation arrangement for connecting two components.

A schematic sectional view of the connection of the parts A, B is shown in FIG. 1. Part A provides an installation opening I, through which the fastening screw S is screwed into the tolerance compensation arrangement 1. The tolerance compensation arrangement 1 consists of an adjusting element 10 which is held in a base element 40 via a thread connection. The base element 40 comprises a holding structure 60. The base element 40 and thus the complete tolerance compensation arrangement 1 is fastenable to a fastening structure 82 of the component or part B by means of the holding structure 60.

Part B may include a fastening opening O. A blind rivet nut 80 may be fastened in this opening O. The blind rivet nut 80 includes a fastening collar 82 which adjacent to the fastening opening O, rests upon the surface of part B which faces the tolerance compensation arrangement 1. The fastening collar 82 is configured with at least two steps with respect to the longitudinal axis of the blind rivet nut 80 and forms the fastening structure for the tolerance compensation arrangement 1.

With regard to the fastening structure 82, configured with two steps means that perpendicular to the longitudinal axis of the blind rivet nut 80, two plane structures 84, 86 are provided adjacent to one another (see FIGS. 4, 5, 10 and 17).

The front side or axial outer plane structure 84; 84' includes a bigger lateral or radial extension in comparison with the at least one adjacent plane structure 86; 86'. Based on this constructive basis, the front-sided or axial outer plane structure 84; 84' forms an axial undercut for the fastening of the holding structure 60 of the base element 40 (see below).

The front-sided or axial outer plane structure 84; 84' may have the shape of a disc. The disc is formed non-round in terms of its circumferential shape. This guarantees the possibility that the structure 84; 84' is received in a form-adapted recess or opening in order to guarantee a torque-proof connection by form-fit between the receiving part and the fastening structure 82; 82'. A non-round form includes an oval, a hexagon, an octagon, a tetragon or another polygon.

The adjacent laterally smaller plane structure 86; 86' may consist of a ring or collar. In the embodiment of the blind rivet nut 80; 80' in FIG. 17, this ring or collar may extend beyond the outer diameter of the shaft 88; 88' of the blind rivet nut 80; 80' and is smaller than the radial extension of the disc 84; 84'.

The installation opening I in part A (see FIG. 1) may be essentially aligned axially with respect to the fastening opening O. This means that both openings I, O ideally lie on a common central axis (not shown). This arrangement facilitates an inserting of the fastening screw S into both openings I, O and the tolerance compensation arrangement 1 as well as the installation thereof as a support between the parts A, B.

The installation opening I may have an inner diameter which is significantly larger than an outer diameter of the fastening screw S. In order to still guarantee a hold or a support of the fastening screw S at part A and in the installation opening I, a disc may be arranged on the fastening screw S. An outer diameter of the disc is larger than an inner diameter of the installation opening so that the head bottom side of the fastening screw S rests upon part A via the disc.

As with regard to its inner diameter, the installation opening I is configured larger than the outer diameter of the fastening screw S, the fastening screw S can be offset radially during the installation in the installation opening I, in order to adopt the matching fastening position. Radial tolerances regarding the alignment of the installation opening I can be compensated by that with respect to the fastening opening O. This lateral tolerance compensation ensures that the fastening screw S and the tolerance compensation arrangement 1 essentially extend perpendicularly to the supporting surfaces at parts A and B. Accordingly, a collar of the adjusting element 10 may rest upon part A in an optimal manner, while the base element 40 can couple to the fastening structure 82.

A first embodiment of the tolerance compensation arrangement 1 is illustrated in FIGS. 2 to 8. A second embodiment of the tolerance compensation arrangement 1' is shown in FIGS. 9 to 12 and a third embodiment of the tolerance compensation arrangement 1" is illustrated in FIGS. 13 to 16.

The embodiments of the tolerance compensation arrangement 1; 1'; 1" may include the adjusting element 10; 10'; 10". The adjusting element 10; 10'; 10" may be configured with an identical construction in the configurations of the tolerance compensation arrangement 1; 1'; 1" and may be provided as an injection molding part out of plastic material. Thus, the descriptions of the adjusting element 10; 10'; 10" similarly apply to all embodiments of the tolerance compensation arrangement 1; 1'; 1".

Furthermore, the tolerance compensation arrangement 1; 1'; 1" of no matter which of the embodiments may be fastened with the fastening screw S in the blind rivet nut 80; 80'. Therefore, all descriptions of the fastening screw S analogously apply to all embodiments of the tolerance compensation arrangement 1; 1', 1".

Figure 2:
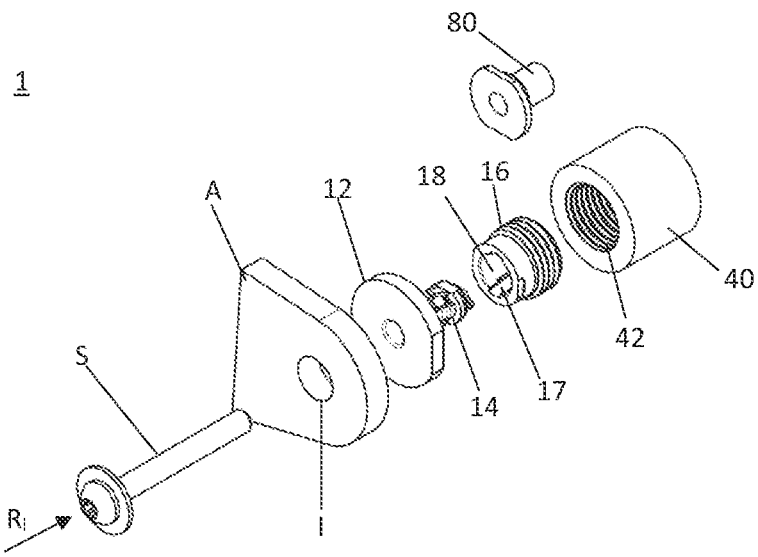
Figure 3:
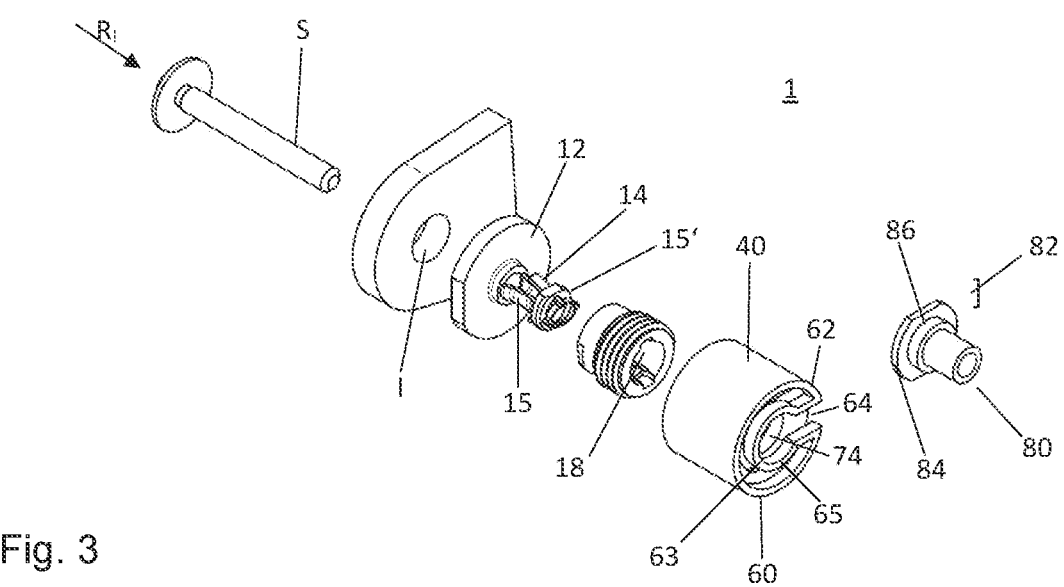
Figure 4:
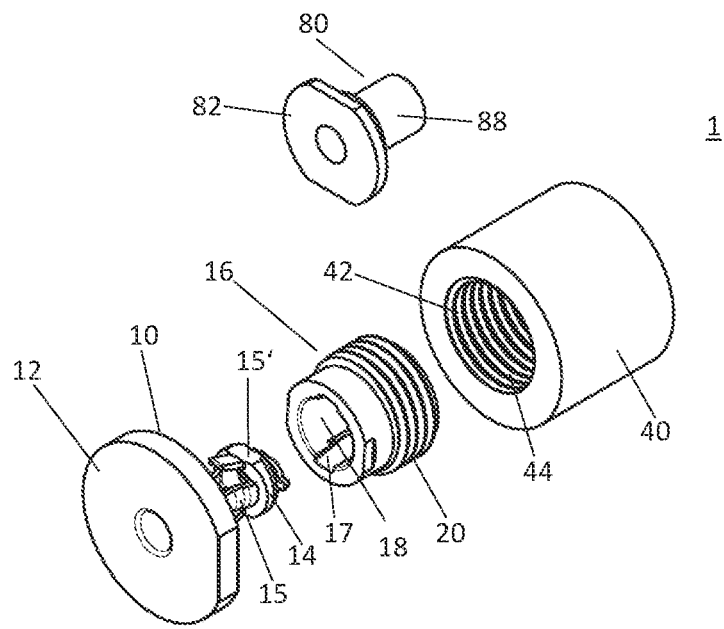
Figure 5:
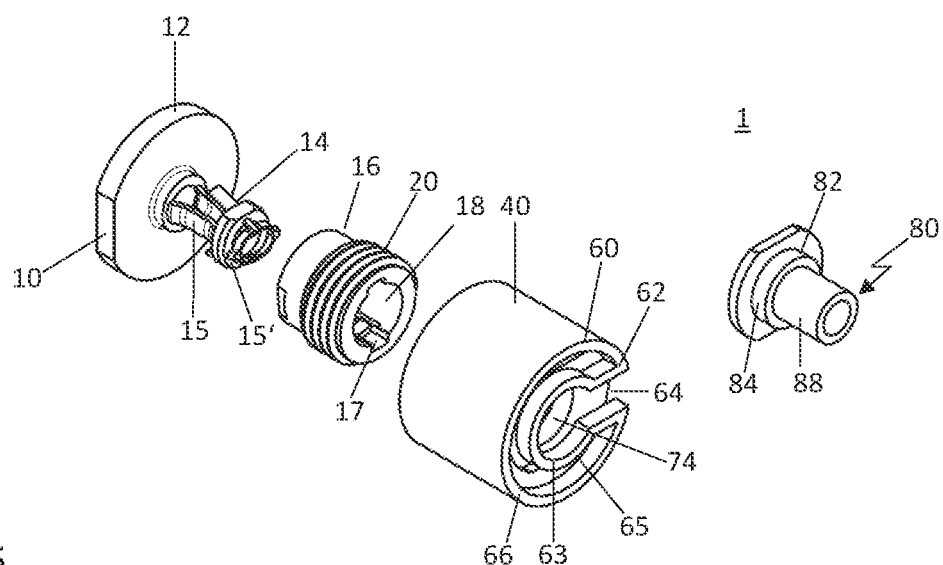
Figure 6:
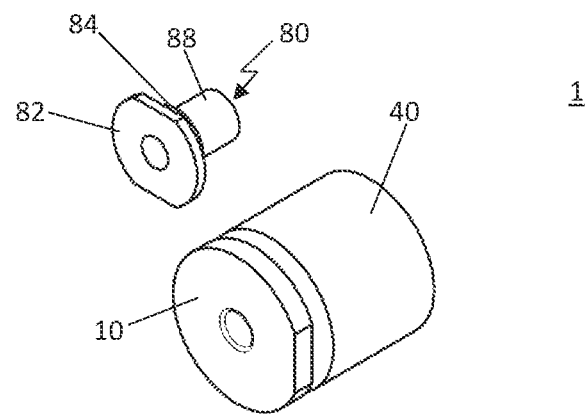
Figure 7:
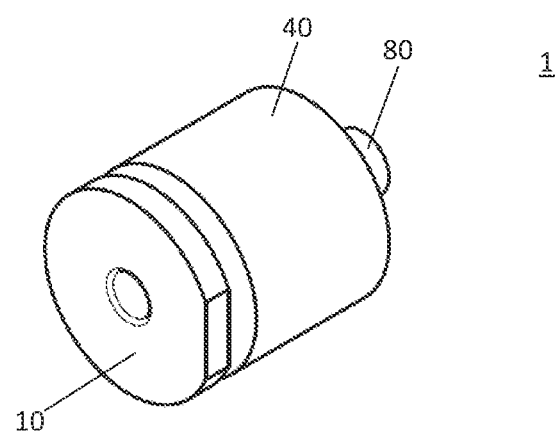
Figure 8:
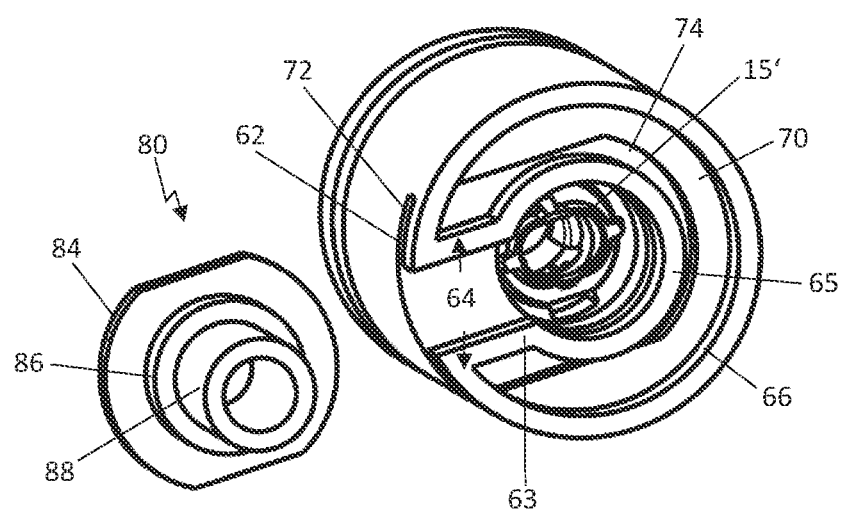
Figure 9:
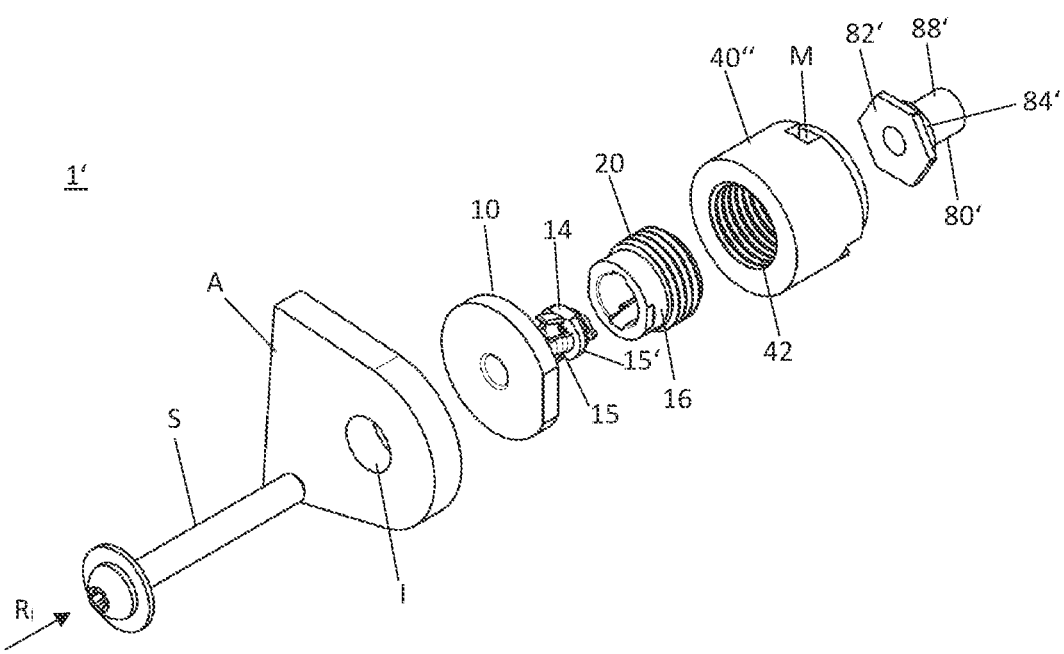
Figure 10:
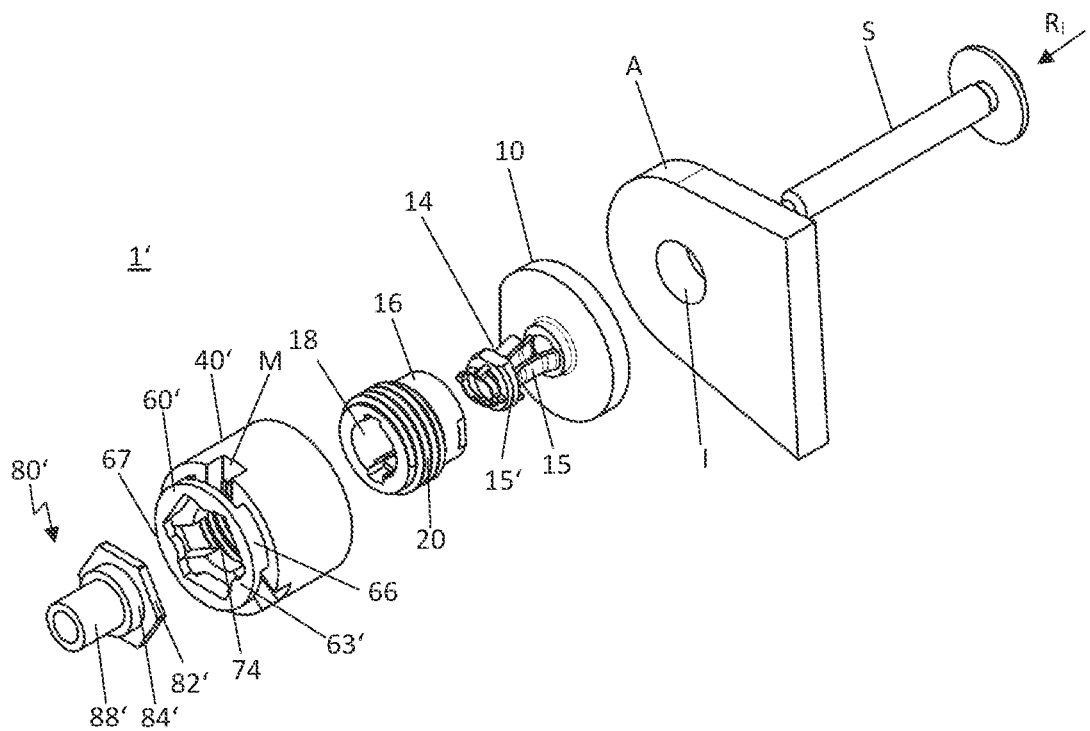

FIGS. 2 and 3 show the tolerance compensation arrangement 1 in an exploded view. The tolerance compensation arrangement 1 is fastened with the fastening screw S through a passage opening I of the first part A. For this purpose, the fastening screw S is screwed into the blind rivet nut 80 which is fastened to part B.

The tolerance compensation arrangement 1 comprises a sleeve-like base element 40 with an inner thread 42 of a first thread direction. The base element 40 may be made of plastic material and is produced by means of an injection molding method. The base element 40 may be made of metal.

According to the depicted embodiment, the sleeve-like base element 40 has a round outer contour. The base element 40 may be provided with a non-round outer contour, for example a hexagon or an octagon.

The adjusting element 10 is screwed into the inner thread 42 of the base element 40. The adjusting element 10 may also completely consist of plastic material and is produced in an injection molding method. The thread sleeve 16 may be provided out of metal. For reasons of stability, this may be chosen in coordination with the material of the base element 40.

The adjusting element 10 includes a supporting collar 12. Facing away from the base element 40, the front side of the adjusting element 10 forms the abutting surface at part A, when the tolerance compensation arrangement 1 bridges the distance between the parts A and B. A dragging element 14 is fastened to the front side of the supporting collar 12 which faces the base element 40. In the first place, the dragging element 14 extends perpendicularly from the supporting collar 12.

Furthermore, the adjusting element 10 includes a thread sleeve 16 which is tightly connected with the supporting collar 12. The thread sleeve 16 includes a passage channel 18 and an outer thread 20. The outer thread 20 is formed so as to match the inner thread 42 of the base element 40.

The dragging element 14 which extends from the supporting collar 12 projects into the passage channel 18 of the thread sleeve 16. At least one radially inwardly projecting spring arm 15 is provided at the dragging element 14, which narrows the passage channel 18. According to different configurations of the dragging element 14, two, three or more spring arms 15 may be arranged in a circumferentially spread manner in order to form a friction-fit connection with the fastening screw S. These spring arms 15 may extend in longitudinal direction of the adjusting element 10. According to a shown configuration, the spring arms 15 may extend curvilinearly with a radially inwardly directed curvature. This curvature narrows the passage channel 18 in order to generate a friction-fit with the fastening screw S when the same is screwed in.

The plurality of spring arms 15 may extend in a curvilinear way or straight (not shown) and holds an oval spring ring 15' (see FIGS. 3-5, 9, 10, 13-15). The spring ring 15', which can functionally also be referred to as dragging ring, has a smaller diameter than the outer diameter of the fastening screw S, at least in parts. Accordingly, a releasable friction-fit connection between fastening screw S and spring ring 15' arises when the fastening screw is screwed into the spring ring 15', so that the dragging element 10 is co-rotated until abutment at part A.

The dragging element 14 may be fastened in a locking way within the thread sleeve 16 via a corresponding channel-like recess 17. Alternatively to that, the dragging element 14 may be glued into or pressed into the thread sleeve 16.

Facing away from the adjusting element 10, the base element 40 comprises the holding structure 60 on the front side. The holding structure 60 may be constructed with two steps. For this purpose, when observed in axial direction, i.e. axially outwardly, there is a locking step 62. The locking step 62 is formed by a loop-like locking web 63. The locking web 63 is configured non-closed circle-like and includes an area which is smaller than the cross-sectional area of the base element 40. The locking web 63 may lie in a radial plane with respect to the longitudinal axis of the base element 40.

In radial direction, the locking web 63 includes an insert opening 64 for the fastening structure 82. The width of the insert opening 64 and a diameter of the loop-like locking web 63 in the radial plane are formed big enough so that the smaller structure 86; 86' of the fastening structure 82 can be locked through the insert opening 64 in the locking web 63.

For this purpose, parts of the locking web 63 adjacent to the insert opening 64 can evade springly to the side within the radial plane. This is shown by arrows in FIG. 9. As soon as the fastening structure 86 has passed the insert opening 64, it is held in the circle-like part of a spring loop 65 of the locking web 63.

The locking web 63 may be surrounded by a circumferential axial web 66. The axial web 66 extends in axial direction facing away from the adjusting element 10 and holds the locking web 63 in a springy manner at the base element 40. It may furthermore serve the supporting of the base element 40 at part B when the tolerance compensation arrangement 1 is fastened with the fastening screw S.

In a radial plane, a supporting structure 70 is provided as a supporting step, the structure being arranged in longitudinal direction of the base element 40 axially adjacent to the locking web 63. The supporting structure 70 may be accessible via a further lateral insert opening 72, which is arranged axially adjacent to the insert opening 64. Compared with the insert opening 64, the insert opening 72 is configured larger in circumferential direction of the base element 40. By that, it is possible to slide the front-sided supporting structure or disc 84; 84' into the supporting structure 70.

The supporting structure 70 includes a recess 74 in an axial direction facing away from the locking web 63. The shape of the recess 74, which may be the circumferential shape, may be adapted to the shape of the plane or two-dimensional structure 84 in order to receive the same at it in a form-fit manner. As the recess 74 and the structure 84 have a non-round shape, the base element 40 and thus the tolerance compensation arrangement 1 are held torque-proof after receiving the structure 84 in the recess 72.

The insert opening 72 may be adapted in terms of its size, which may be the circumferential extension, to the structure 84 of the fastening structure 82 such that the structure 84 can radially inwardly pass the insert opening 72 in one specific alignment, only. By that, it may be guaranteed that already with the passing of the insert opening 72, the form-fit between the supporting structure 70 and the fastening structure 82 may be established.

Alternatively, the insert opening 72 may be chosen big enough that the fastening structure 82 may be insertable in any orientation. Subsequently, only the worker's action is necessary of rotating the base element 40 relatively to the fastening structure about its longitudinal axis L until the form-fit has been established.

According to a further embodiment of the locking step 62, two webs may be provided which are radially adjacent to one another instead of the ring-like locking web 65. Each of the two locking webs would not extend straight-lined within the axial web 66, similar to a chord, so as to clamp the structure 86; 86' between them. The distance of the radial webs in the radial plane would be less than the outer diameter of the structure 84; 84' in order to undercut the fastening structure 82; 82' fittingly at the structure 84; 84'.

A further embodiment of a tolerance compensation arrangement 1' is shown in FIGS. 9 to 12. While the fastening screw S and the adjusting element 10 are identical to the above-described embodiment, the sleeve-like base element 40' may have a similar holding structure 60'. For clarification, the base element 40' is shown in larger detail in FIG. 11.

The base element 40' is constructed sleeve-like and has an inner thread 42. The holding structure 60' has a locking step 62' that is arranged on the front side or axially outwardly (see longitudinal axis L). The locking step 62' is characterized by a plurality of circumferentially distributed and radially inwardly projecting locking webs 63'. Three locking webs 63' may be arranged such that they radially narrow an axial insert opening 64' perpendicular with respect to the longitudinal axis L.

The locking webs 63' are fastened to a ring-like structure 61. The ring-like structure 61 may stand on a plurality of axial webs 66', which form spring webs 67 with at least one locking web 63' in circumferential direction of the structure 61.

Furthermore, the ring-like structure 61 encompasses an axial insert opening 64, into which the fastening structure 82' is insertable in axial direction to the adjusting element 10.

The inner shape of the ring-like structure 61 is adapted to the non-round outer contour of the at least two-stepped polygonal fastening structure 82'.

The inner contour of the ring-like structure 61 and thus the shape of the axial insert opening 64 may be adapted to the fastening structure 82.

When the fastening structure 82; 82' has passed the axial insert opening 64', the radial locking webs 63' undercut the front-sided plane structure 84; 84'. Three sides which are not directly adjacent to one another of the hexagonal structure 84' may be arranged parallel to the inner sides 68 of the axial webs 66. Because the radial inner sides 68 of the axial webs 66 may form the supporting structure 70' and generate the torque-proof form-fit between the holding structure 60' and the fastening structure 82'.

Figure 11:
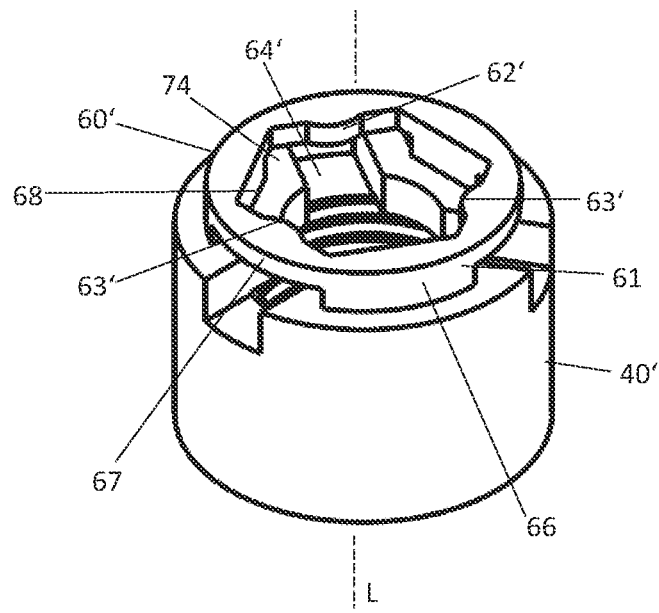
Figure 12:
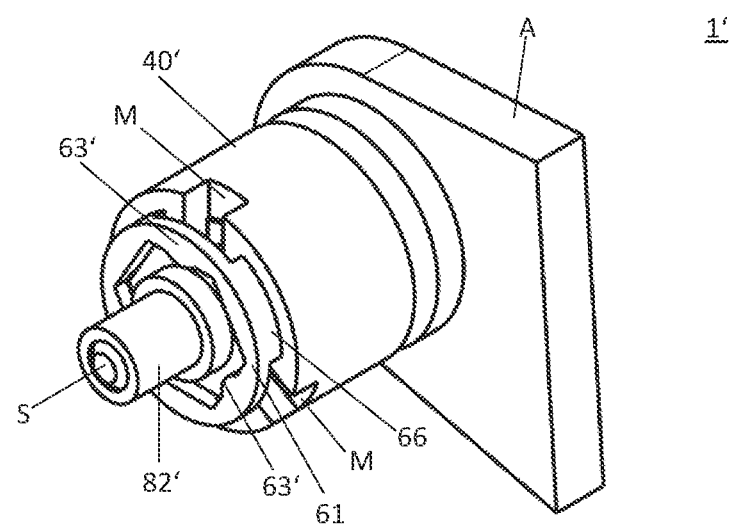
Figure 13:
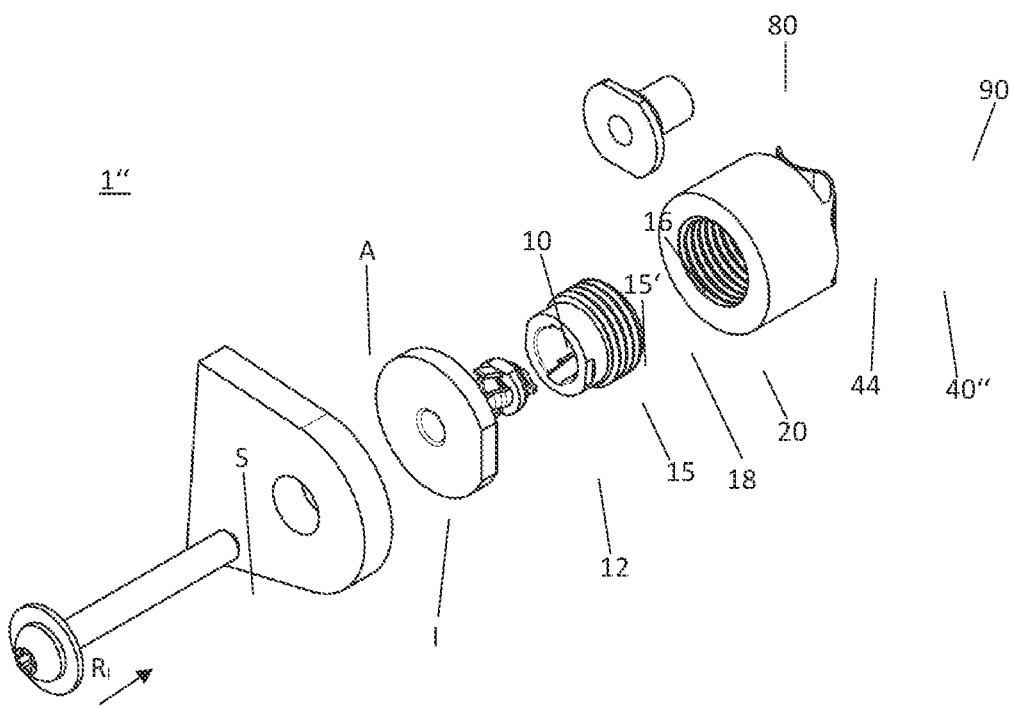
Figure 14:
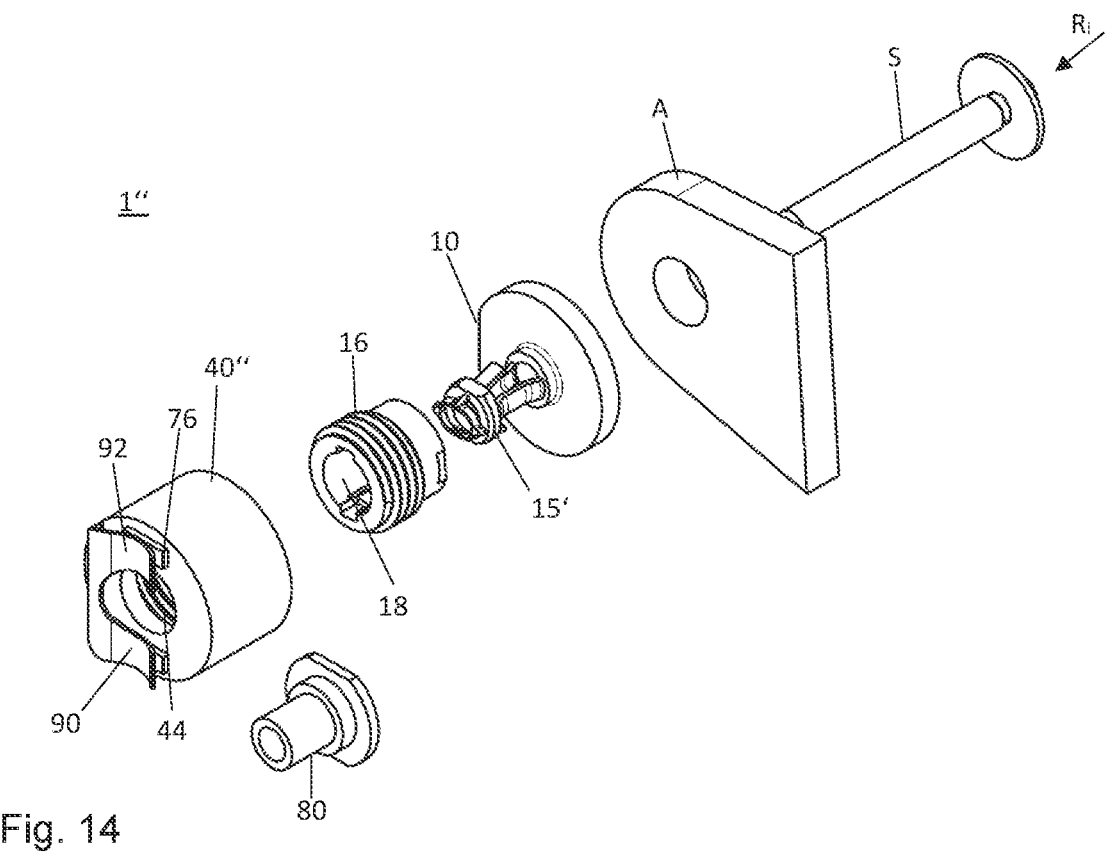
Figure 15:
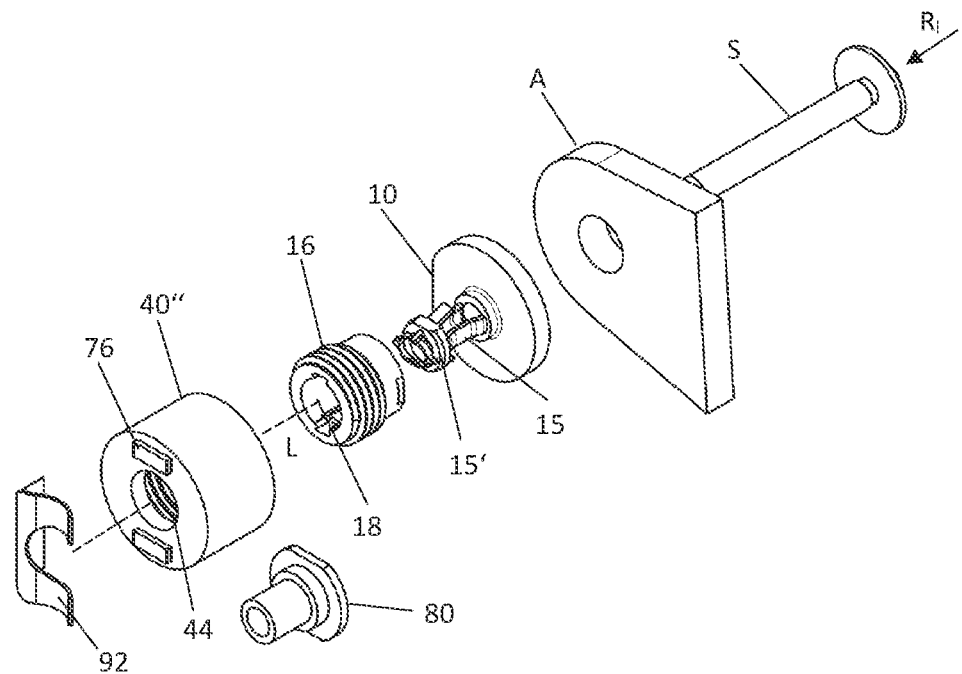

FIG. 12 shows the base element 40' of FIG. 11 in the screwed-in state in the tolerance compensation arrangement 1. For this purpose, a blind rivet nut 82' is locked behind the locking webs 63' after being inserted into the axial insert opening 64 and rests upon the radial inside of the axial webs 66 in a form-fit manner.

In case the form-fit between the fastening structure 82' and the supporting structure 70' is not already generated when locking the fastening structure 82' through the axial insert opening 64', at least a radial mounting opening M is provided at the base element 40'. The worker may access the at least one mounting opening M with a tool in order to rotate the base element 40' in a matching form-fit with the fastening structure 82'.

A further embodiment of the tolerance compensation arrangement 1" is shown in FIGS. 13 to 16 in different exploded views. With respect to the previously described tolerance compensation arrangements 1; 1', the further embodiment complies with their fastening screws S, the adjusting element 10 and the blind rivet nuts 80; 80'. Only the base element 40" may comprise, in contrast to the other base elements 40; 40', a further holding structure 60". Apart from the following description of the holding structure 60", the above-described features of the tolerance compensation arrangements 1 and 1' therefore apply analogously to the further embodiment of the tolerance compensation arrangement 1".

The base element 40" is also constructed sleeve-like with the inner thread 42. A holding structure 60" for connecting with the fastening structure 82; 82' of the blind rivet nut 80; 80' is provided on the front side facing away from the adjusting element 10.

The holding structure 60" includes a fork-like holding web 90 that is arranged on the front side.

The fork-like holding web 90 may have two spring arms 92, extending parallel and arranged laterally adjacent to one another. Even if for realizing the tolerance compensation arrangement 1" only one spring arm 92 was sufficient, two spring arms 92 may be arranged perpendicularly to the longitudinal axis L of the base element 40" or to the installation direction $R_I$. The spring arms 92 are fastened with one end to the base element 40", which may be adjacent to the outer surface area and front side of the base element 40". This supports a springing movability of the spring arms 92 parallel to the longitudinal axis L of the base element 40" and to the installation direction $R_I$ of the fastening screw S.

The two spring arms 92 may lie in a joint curved plane extending perpendicularly to the longitudinal axis. In accordance with this curved plane, the spring arms 92 are configured concave in an arched way with respect to the base element 40". This means that the non-fastened ends of the spring arms 92 are bent away from the front side of the base element 40".

Furthermore, the two spring arms 92 are spaced from each other by at least the outer diameter of the structure 86; 86' of the fastening structure 82; 82' in order to receive the same between them in the installed state. Furthermore, the spring arms 92 are spaced from each other by less than the outer diameter or the minimum lateral extension of the front-sided structure 84; 84' of the fastening structure 82; 82'.

Due to the above-described arrangement and shape of the spring arms 92, the fastening structure 82; 82' may be slid between the spring arms 92 from the side or in radial direction. In this context, the fastening structure 82; 82' may have a sufficient distance to the adjacent front side of the base element 40" at which a supporting structure 70 may be provided. The sliding-in, which is axially spaced from the base element 40", of the fastening structure 82; 82' between the spring arms 92 is facilitated due to their bent form. The interim space formed between the spring arms 92 has a depth so that the slid-in fastening structure 82; 82' may position the shaft 88; 88' with the thread of the blind rivet nut 80; 80' approximately coaxially with respect to the passage opening 44 of the base element 40".

After the inserting of the fastening structure 82; 82' between the spring arms 92, the spring arms 92 spring back into their initial position adjacent to the front side of the base element 40". The front-sided structure 84; 84' of the fastening structure 82; 82' may be thereby pressed against the front side of the base element 40" which faces away from the adjusting element 10.

According to the disclosure, a supporting structure 70" may be provided on the front side of the base element which faces away from the adjusting element 10. It comprises at least two positioning webs 76 at which the non-round front-sided structure 84; 84" abuts. Accordingly, a torque-proof form-fit connection arises between the positioning webs 76 and the fastening structure 82; 82' as the positioning webs 76 prevent a rotating of the non-round structure 84; 84' on the front side of the base element 40" due to their arrangement (see FIGS. 14 and 15).

Figure 16:
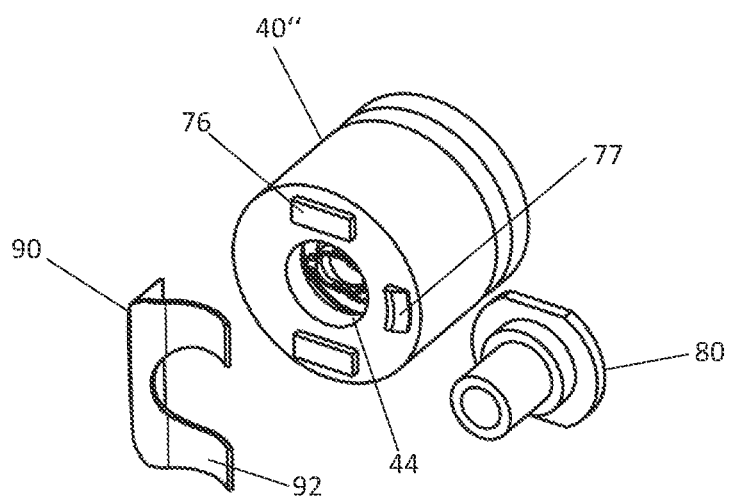
Figure 17:
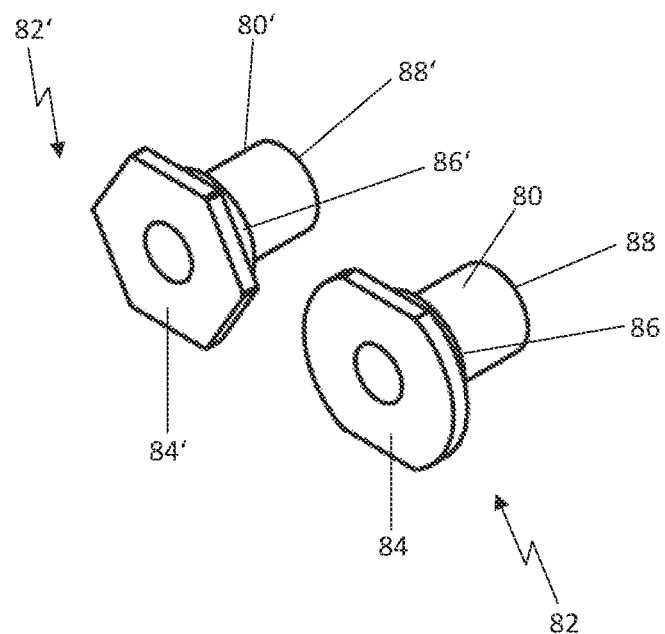
Figure 18:
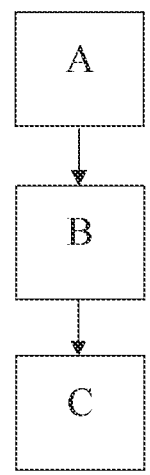
Figure 19:
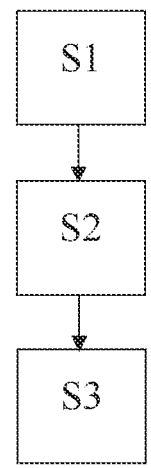

According to a further embodiment, more than two positioning webs 76, which may be three or four, are arranged at the front side on the base element 40" in a circumferentially distributed manner around the passage opening 44 of the base element 40". This is shown in FIG. 16. The positioning web 77 is arranged in insertion direction between the spring arms 92 on the front side of the base element. The web may be formed as a web which is aligned perpendicularly to the spring arms 92 and to the positioning web 76. The positioning web 77 may be provided as a front-sided projecting round or oval locking latch (not shown). As the positioning webs 76, 77 are arranged jointly with the holding web 90 around the passage opening 44, they may hold the fastening structure 82; 82' and the base element 40 in matching alignment, in order to be able to screw the fastening screw S into the blind rivet nut 80. The positioning web 77 may have a lead-in chamfer. The lead-in chamfer facilitates the inserting of the fastening structure 82; 82' between the spring arms 92.

The positioning webs 76, 77 may be implemented as a web extending in an arched manner around the passage opening 44.

The base element 40" with fork-like holding web 90 may also be produced in the injection-molding method. For this purpose, the holding web 90 is prefabricated out of a spring sheet, which may be punched or bent. Following that, the holding web is molded into the base element 40" during the injection molding method.

The invention claimed is:

1. A tolerance compensation arrangement for fastening a first component to a second component with automatic compensation of tolerances in the distance between the first component and the second component, comprising the following features:
- a. a sleeve base element with a passage opening, the radial inner side of which comprises an inner thread of a first thread direction,
- b. an adjusting element with a supporting collar facing away from the base element at the front side and with a thread sleeve comprising, at a radial outside, an outer thread which matches the inner thread of the base element and in a passage channel, a dragging element, preferably having at least one radially inwardly projecting spring arm, which narrows the passage channel,
- c. on a first front side of the base element, the adjusting element is screwed into the passage opening and on a second front side of the base element, a holding structure is provided on the front side which faces away from the adjusting element, the holding structure having
- d1. at least one locking web being arranged in a springy manner, in combination with a supporting structure arranged adjacent to the locking web and adapted to a form-fit to be generated, so that via a lateral or an axial insert opening in the front-sided holding structure, a fastening structure configured with two steps in at least an axially longitudinal direction, preferably a two-stepped supporting collar of a blind rivet nut, is fastenable torque-proof in a friction-fit and form-fit manner in the holding structure via a lateral or an axial insert opening in the front-sided holding structure, or
- d2. a fork holding web arranged in a springy manner in combination with a supporting structure which is arranged axially adjacent to the holding web and is adapted to a form-fit to be established, so that via a lateral insert opening in the holding web and an axial insert opening in the front-sided holding structure, a fastening structure which is configured with two steps at least in longitudinal-axial direction, preferably a two-stepped supporting collar of a blind rivet nut, is fastenable torque-proof in the holding structure in a friction-fit and form-fit manner.

2. The tolerance compensation arrangement according to claim 1 including feature d1, in which the holding structure with lateral insert opening in the direction of a central axis of the base element comprises a locking step, arranged perpendicularly to the central axis, with a locking plane, and axially adjacent to that, a plane supporting step arranged perpendicularly to the central axis.

3. The tolerance compensation arrangement according to claim 2, in which the locking step includes a plane spring loop with a lateral insert opening or two non-linearly extending spring arms lying opposite to one another and spaced to one another, which is/are encompassed by an axially aligned supporting collar.

4. The tolerance compensation arrangement according to claim 3, in which the supporting step has a non-round recess in the direction of the central axis of the base element, in which the fastening structure is receivable in a form-fit manner via the lateral insert opening.

5. The tolerance compensation arrangement according to claim 3, in the holding structure of which the locking step, in the direction of the central axis of the base element, is arranged such that is faces away from the adjusting element, and the supporting step is arranged such that it faces towards the adjusting element.

6. The tolerance compensation arrangement according to claim 2, in which the supporting step has a non-round recess in the direction of the central axis of the base element, in which the fastening structure is receivable in a form-fit manner via the lateral insert opening.

7. The tolerance compensation arrangement according to claim 2, in the holding structure of which the locking step, in the direction of the central axis of the base element, is arranged such that is faces away from the adjusting element, and the supporting step is arranged such that it faces towards the adjusting element.

8. The tolerance compensation arrangement according to claim 1 including feature d1 in which the holding structure with axial insert opening comprises on the front side in the direction of a central axis of the base element the axial insert opening with an axial locking step having holding locking latches in axial direction and adjacent to that, a supporting step arranged perpendicularly to the central axis and adapted to a form-fit.

9. The tolerance compensation arrangement according to claim 8, in which the holding structure includes at least two radially or laterally inwardly protruding locking latches which are arranged in a ring around the axial insert opening and limit a receiving space of the supporting structure in axial direction facing away from the adjusting element.

10. The tolerance compensation arrangement according to claim 9, in which the supporting structure includes a non-round recess in the direction of the central axis in which the fastening structure is receivable in a form-fit manner via the axial insert opening.

11. The tolerance compensation arrangement according to claim 8, in which the supporting structure includes a non-round recess in the direction of the central axis, in which the fastening structure is receivable in a form-fit manner via the axial insert opening.

12. The tolerance compensation arrangement according to claim 1 including feature d1, in which a fastening screw with a thread of a second thread direction contrary to the first one is provided.

13. The tolerance compensation arrangement according to claim 1 including feature d2, in which the fork holding web is arranged on the second front side of the base element and includes two spring webs adjacent to one another and extending perpendicularly to the longitudinal axis of the base element, with the spring webs extending laterally to the passage opening.

14. The tolerance compensation arrangement according to claim 13, in which the supporting structure comprises at least two positioning webs on the second front side of the base element, preferably three or four, adjacent to the passage opening, which are adapted so as to form a torque-proof form-fit with the fastening structure.

15. A first and a second component which are fastened to one another via the tolerance compensation arrangement according to claim 1 by means of a fastening screw, wherein the first component includes a passage opening for the fastening screw and wherein in a fastening opening of the second component, a blind rivet nut with a front-sided supporting collar that is at least two-stepped in axial direction is arranged, to which supporting collar the base element is fastened and into which the fastening screw is screwed.

16. A production method of a tolerance compensation arrangement according to claim 1, comprising the following steps:
- a. providing the sleeve base element with a passage opening, the radial inner side of which includes an inner thread of a first thread direction, preferably by means of an injection molding method, b. providing the adjusting element with a supporting collar and with a thread sleeve, preferably by means of an injection molding method, wherein the thread sleeve includes an outer thread on a radial outside matching the inner thread of the base element and includes in a passage channel a dragging element with preferably at least one radially inwardly projecting spring arm, the dragging element narrowing the passage channel, after that, c. screwing the adjusting element into the base element.

17. An installation method of a tolerance compensation arrangement according to claim 1, comprising the following steps:

a. fastening the base element to a supporting collar having at least two steps in axial direction of a blind rivet nut that is arranged in a fastening opening of the second component, by fastening the supporting collar in the front-sided holding structure of the base element, b. screwing a fastening screw through a passage opening of the first component into the adjusting element within the base element of the tolerance compensation arrangement, thereby bridging a distance between the first and the second component by means of a length adjustment of the tolerance compensation arrangement, and subsequently c. screwing the fastening screw into the blind rivet nut at the second component.

* * * * *